E. S. Hutchinson,
Oscillating Meter.

No. 68,081. Patented Aug. 27, 1867.

Witnesses:
Chas. D. Smith.
J. E. M. Bowen.

Inventor:
Elias S. Hutchinson
By Livingston
Attorneys.

United States Patent Office.

ELIAS S. HUTCHINSON, OF BALTIMORE, MARYLAND.

Letters Patent No. 68,081, dated August 27, 1867.

IMPROVED LIQUID AND SPIRIT-METER.

*The Schedule referred to in these Letters Patent and making part of the same.*

TO ALL WHOM IT MAY CONCERN:

Be it known that I, ELIAS S. HUTCHINSON, of Baltimore, in the county of Baltimore, and State of Maryland, have invented a new and useful Liquid-Meter; and I do hereby declare the following to be a full, clear, and exact description of the same, reference being had to the accompanying drawings, which are made part of this specification.

The subject of this invention is an apparatus whose function is to record the amount of proof spirit manufactured by the distiller, for which purpose the meter is so situated in the distillery that the liquor cannot be run off without passing through it, the intention being to prevent fraud upon the revenue and enable the designated official to determine assessments with certainty.

The principal features of my invention consist, first, in a means for compensating for variations in the strength or density of the liquor, as indicated by the hydrometer, such means adapting the meter to indicate or record the precise equivalent in proof spirit of the entire quantity of liquor passing through the meter, whether the strength of the liquor be greater or less than that of the proof spirit; secondly, in a means for compensating for difference in bulk due to variations of temperature, said means adapting the meter to record the proof spirit as of a bulk the same as that which it possesses under the normal or standard temperature, whether the temperature of the liquor be greater or less than the normal temperature at the time of its passage through the meter.

Similar letters of reference indicate corresponding parts in the several figures.

Figure 1:
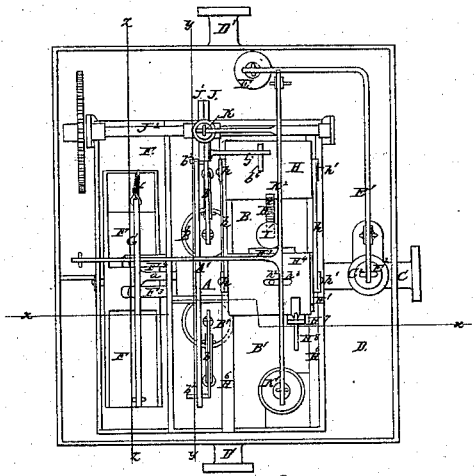
Figure 1 is a plan of my improved meter.
Figure 3:
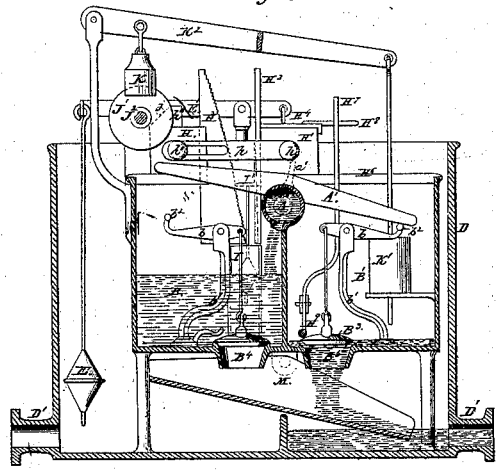
Figures 3 and 4 are vertical sections, in the planes indicated by the lines $z\ z$ respectively.
Figure 2:
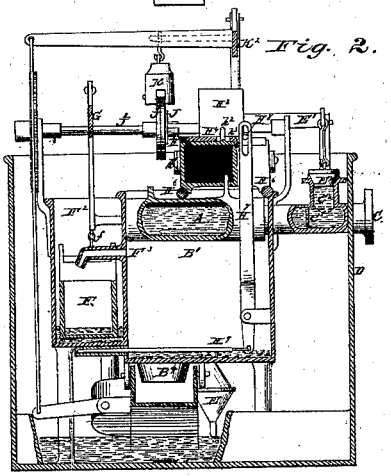
Figure 2 is a vertical section thereof, in the plane indicated by the line $x\ x$, fig. 1.
Figure 4:
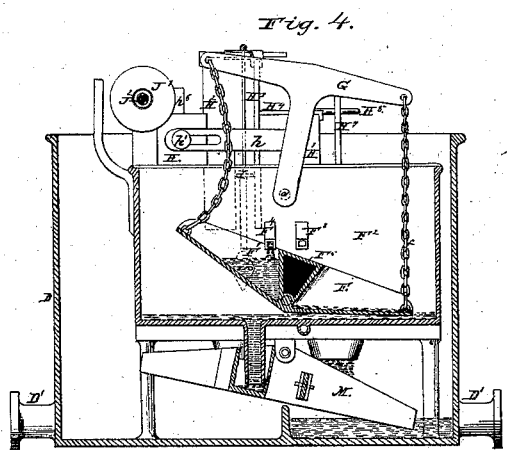

In the drawings, A represents an oscillating cylindrical valve whose axial motion causes it to alternately discharge into chambers B $B^1$, which are of equal dimensions. The liquor, in passing from the condenser of the still, is conducted into the pipe C, communicating with the interior of valve A. A perforated metallic disk, a piece of wire gauze, or any other suitable filtering medium, $C^1$, is placed within the pipe C for the purpose of excluding from the meter any impurities or solid matter which may be contained in the liquor; but the special function of $C^1$ in this apparatus is to prevent the mash or beer from running into the meter and obstructing its operations in case of the boiling over of the still. A pipe, $C^2$, communicating with and extending upwards from the inlet pipe C, permits the mash or beer to escape into the back compartment of the box or case D surrounding the meter. The box surrounding the meter is in two compartments. The back, with which the outlet pipe $C^2$ communicates, does not communicate with the working part of the meter, but is provided with openings in bottom to allow the mash to escape. The front compartment communicates with valve $E^2$ by float E and lever $E^1$, the float being raised and valve closed in case the outlet pipe is obstructed in order to flood the meter. $B^2$ $B^3$ are valves which are respectively employed to guard discharge-openings $B^4$ $B^5$ in the bottom of the chambers B $B^1$ of the meter. Each of these valves is connected to a lever, $b$, which is pivoted or fulcrumed upon a support, $b^1$, said levers having each a lateral projection, $b^2$, occupying the plane of motion of an oscillating arm, $A^1$, which is mounted upon and derives its motion from the oscillating valve A. F $F^1$ represents a trough mounted upon trunnions and occupying the apartment $F^2$, adjoining the chambers B $B^1$, and communicating therewith by spouts $F^3$ $F^4$. This trough is divided into two compartments, F $F^1$, by the central partition $F^5$, the tilting of the trough adapting its compartments to alternately receive liquor from the spouts $F^3$ $F^4$, as illustrated in fig. 4. $ff$ are cords or chains which connect the tilting trough F $F^1$ with the T-shaped arm G, which is rigidly attached to the axial shaft $a$ of the oscillating valve A, which, through these connections, receives its motion from the tilting trough F $F^1$ when the meter is in use. H $H^1$ represent two square supports mounted so as to traverse horizontally upon the rails $H^6$ $H^6$, and connected together by means of the slotted links $h\ h$ and studs $h^1\ h^1$. A pin, $a'$, (see figs. 2 and 3,) projecting upward from the valve A, serves to move the support $H^1$ back and forth as the valve oscillates. An angular plate, $H^2$, with its inclined edge presented toward the support $H^1$, is rigidly fixed to the support H. In the chamber B is permanently fixed an hydrometer, I, (see fig. 3,) the stem of which is furnished with a disk, $I^1$, which, as the float of the hydrometer rises and falls, is permitted to play vertically between the inclined edge of the plate $H^2$ and the adjacent surface of the plate $H^3$. The plate $H^3$ is wedge-shaped in its horizontal section, or, in other words, its thickness diminishes from the inner to the outer edge, for a purpose to be explained. It is attached to and has its position governed by a slide, H⁴, which rests upon the support H⁵, said slide being provided with a slot, h³, for a guide-pin, h². The oscillation of the valve A in one direction serves to move the support H¹ against the disk I¹, which, bearing against the inclined edge (which is preferably notched or roughened) of the plate H², communicates motion from H¹ to H. The support H carries a plate, h⁶, the outer edge of which is inclined at a suitable angle to adapt it to raise the rod j when the support H is undergoing the effective movement above referred to. The rod j is attached to and gives a partial rotation to a disk J, which is loosely fitted upon the shaft J², but which, at the moment the plate h⁶ acts upon the rod j, is coupled or held in connection with an adjoining disk, J¹, by means of the clutch K, which clamps the two disks J J¹ together, as illustrated in fig. 2. This simultaneous movement of the disks J J¹ gives a degree of rotary movement to the shaft J² proportionate to that of the support H, and the shaft J² acts with corresponding effect upon a suitable register (not shown) with which it may be connected. The shaft J², and consequently the register, are only actuated at each discharge of the chamber B, the corresponding amount received and discharged by chamber B¹ being, of course, taken into account by the register. As soon as chamber B has discharged its contents and the valve A reversed its position, the chamber B¹ commences to fill, and as the liquor rises in the latter the float K¹ is elevated, and the consequent elevation of the lever K² raises the clutch K so as to release the disks J J¹, in order to give the loose disk freedom to turn upon the shaft J², and enable the rod j to resume, by gravity, the position in which it receives the effective stroke of the plate h⁶. When the chamber B¹ discharges its contents into the trough F F¹ the tilting of the latter again reverses the valve A, and the vibration of the pin a′, which is due to that motion, retracts H H¹ to the position from which they are advanced to act upon the register-shaft, as before described. The slide H⁴ is connected to a slotted lever, H⁷, by the rod H⁸, and the lower extremity of lever H⁷ is connected to an expansible rod, H⁹, located within the chamber B¹, and made fast at one end. The rod is lengthened or shortened by variation in the temperature of liquor, and by having its free end connected to the lever H⁷, the latter, under variation of temperature, is caused to vibrate and effect the lateral adjustment of the slide H⁴ and plate H³, for the purpose of increasing or diminishing the distance between the acting point on the surface of plate H³ and the inclined edge of plate H². Thus, the standard temperature of proof spirit is fixed, (60° Fahrenheit,) and the difference in bulk, which is due to variations of temperature, obviously vitiates the register in the absence of a compensating medium. The plate H³, operated upon by the rod H⁹, as above described, acts to compensate for changes in the temperature of the liquor in a manner which I shall now proceed to explain. It has previously been stated that the plate H³ diminishes in thickness from the inner to the outer edge. Hence the given forward or effective impulse of the support H¹ imparts a greater or less motion to H, according as the part of plate H³ which acts upon the disk I¹ is nearer to or further from the inner or thickest edge of said plate; therefore the variations of temperature of the liquor in this meter are effectually compensated for, because the lateral motion of plate H³, caused by the expansion and contraction of rod H⁹, effects a corresponding difference of result as determined by the register. For like considerations it is obvious that in order to an absolutely correct measurement of proof spirit, it is requisite to compensate for variations in density to which the liquor passing through the meter is liable. This compensation I secure by the employment of the disk I¹, in connection with the angular plate H². Thus, the interposed disk I¹ is the medium of communicating the effective motion of H¹ to H, and the extent of effective motion which the latter receives will depend upon the elevation at which the latter stands when it is forced against the plate H² by the forward or effective motion of H¹, that is to say, the support H, and consequently the register-shaft J², will be moved to a greater or less extent, according to the width of the plate H² at the point against which the disk I¹ is forced by the advancing support H¹. The disk I¹ being attached to the float of the hydrometer I, is made to rise and fall, and thus assume different positions in relation to the inclined edge of plate H², in consequence of whatever variation may occur in the strength of the liquor passing through the meter.

A brief description of the operation may be given as follows: In fig. 3 the chamber B¹ is represented as nearly depleted, its contents discharging through the open outlet port B⁵ into the tilting trough M, which forms a common discharge-trough for the two chambers B B¹. The valve B³ is about to close the outlet port B⁵ by the action of the oscillating arm A¹ on the lever b. At this stage of the operation the float K¹ occupies its lowest position, so as to hold the clutch K upon the disks J J¹, in order to effect the rotation of register-shaft J² when H H¹ are advanced. The valve A is in position to discharge the incoming liquor into chamber B. When the liquor accumulates in the latter till a portion escapes through the spout F¹, the liquor thus allowed to escape falls into the trough F F¹, which is thereby caused to tilt. This movement of the trough F F¹ serves to reverse the valve A, open B², and close B³, and advance the supports H H¹, so as to turn the register-shaft J², as previously explained.

I wish it distinctly understood that I do not wish to limit myself to the precise construction and arrangement herein described, as I propose to employ any substantially equivalent means for attaining the result had in view.

Having thus described my invention, what I claim as new, and desire to secure by Letters Patent, is—

1. The provision, in a liquid-meter, of the plate H² and disk I¹, or their equivalents, the same forming a means for compensating for variations in density, substantially as described.

2. The provision, in a liquid-meter, of the plate H³, and expansible rod H⁹, or their equivalents, the same forming a means for compensations for variations in temperature, substantially as set forth.

3. The combination of the oscillating valve A, supports H H¹, compensating-plate H², and disk I¹, plate h⁶, pin j, wheels or disks J J¹, shaft J², and clutch K, or their equivalents, all substantially as herein described and represented.

4. The combination with the valves $B^2 B^3$, of the levers $b\ b$ and oscillating arm $A^1$, substantially as described and for the purpose specified.

5. The combination with the oscillating valve A and chambers $B\ B^1$, of the tilting trough $F\ F^1$, arranged and operating substantially as described.

6. In spirit-meters, a filter or screen to permit the passage of mash, beer, or solid matter into the meter, substantially as described.

E. S. HUTCHINSON.

Witnesses:
W. H. HAYWARD,
J. E. M. BOWEN.